US011255686B2

(12) United States Patent
Shaukat et al.

(10) Patent No.: US 11,255,686 B2
(45) Date of Patent: Feb. 22, 2022

(54) VEHICLE TRACKING AND ESTIMATED TIME OF ARRIVAL DETERMINATION SYSTEM

(71) Applicant: Telogis Inc., Aliso Viejo, CA (US)

(72) Inventors: Shazib Shaukat, Aliso Viejo, CA (US); John Zvonar, Christchurch (NZ); James Stewart, Avonhead (NZ); Jared Klopper, Christchurch (NZ); Michael J. Cocks, Christchurch (NZ); William Benjamin Joseph Kolodner, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 847 days.

(21) Appl. No.: 15/875,759

(22) Filed: Jan. 19, 2018

(65) Prior Publication Data

US 2019/0226862 A1    Jul. 25, 2019

(51) Int. Cl.
*G01C 21/34* (2006.01)
*G07C 5/00* (2006.01)
*G07C 5/08* (2006.01)
*B60W 40/08* (2012.01)
*H04W 4/029* (2018.01)
(Continued)

(52) U.S. Cl.
CPC ......... *G01C 21/3492* (2013.01); *B60W 40/08* (2013.01); *G01C 21/343* (2013.01); *G07C 5/008* (2013.01); *G07C 5/08* (2013.01); *G08G 1/123* (2013.01); *G08G 1/127* (2013.01);
(Continued)

(58) Field of Classification Search
CPC .... G08G 1/123; G08G 1/127; G01C 21/3492; G01C 21/343; G01C 1/123; G07C 5/008; G07C 5/08; H04W 4/029; H04W 4/40; B60W 40/08; B60W 2556/50; B60W 2040/0872
See application file for complete search history.

(56) References Cited

U.S. PATENT DOCUMENTS

| 2012/0030133 A1* | 2/2012 | Rademaker | G06Q 10/08 705/333 |
|---|---|---|---|
| 2014/0087760 A1* | 3/2014 | Bennett | H04W 4/40 455/456.3 |
| 2015/0046362 A1* | 2/2015 | Muetzel | G06Q 10/08 705/333 |

FOREIGN PATENT DOCUMENTS

WO    WO-02059808 A1 *    8/2002    ........... G06Q 10/047

OTHER PUBLICATIONS

Kunz, Oliver. "Logistics and Fleet Management". Encyclopedia of Automotive Engineering, Online. John Wiley & Sons, Ltd. 2014. (Year: 2014).*

(Continued)

*Primary Examiner* — Jeffrey C Boomer

(57) ABSTRACT

A device can communicate with a set of devices to obtain input data from a set of data sources. The device can process the input data to determine a state of a first job, of a plurality of jobs, based on the state of the vehicle and the state of the operator of the vehicle. The device can determine, based on the state of the first job, a plurality of estimated times of arrival of the vehicle at two or more downstream jobs, of the plurality of jobs, occurring after the first job. The device can determine, based on the plurality of estimated times of arrival, a set of alerts or a set of response actions relating to the plurality of estimated times of arrival of the vehicle. The device can communicate with at least one customer device to provide the alert or implement the response action.

20 Claims, 6 Drawing Sheets

(51) Int. Cl.
*H04W 4/40* (2018.01)
*G08G 1/127* (2006.01)
*G08G 1/123* (2006.01)

(52) U.S. Cl.
CPC ............ *H04W 4/029* (2018.02); *H04W 4/40* (2018.02); *B60W 2040/0872* (2013.01); *B60W 2556/50* (2020.02)

(56) References Cited

OTHER PUBLICATIONS

Glympse for Business, "Connect with Your Customers Through Location-Powered Experiences," http://www.glympse.com/business, Nov. 13, 2015, 6 pages.

\* cited by examiner

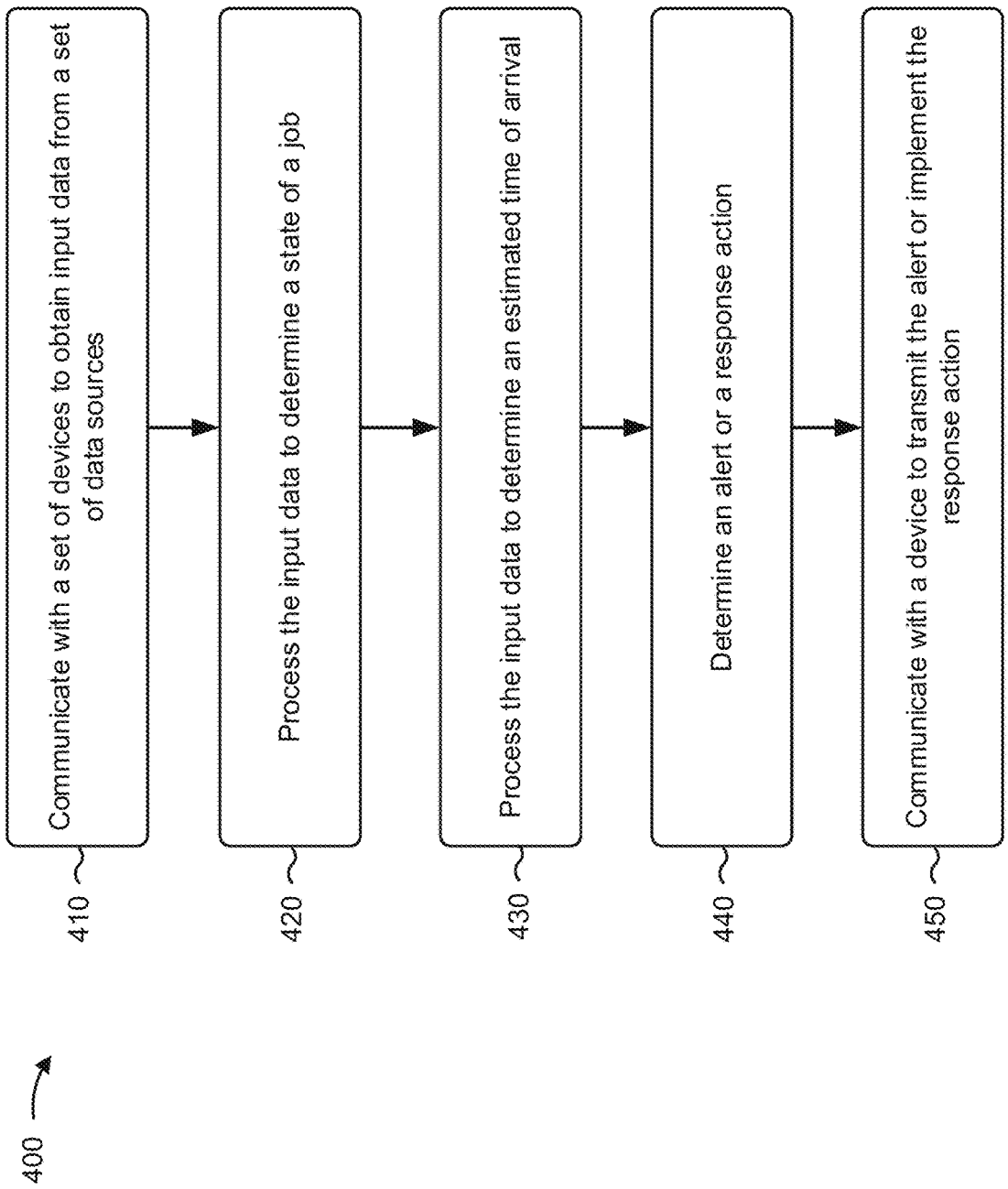

VEHICLE TRACKING AND ESTIMATED TIME OF ARRIVAL DETERMINATION SYSTEM

BACKGROUND

A delivery entity, such as a delivery person, a telematics device of a delivery vehicle, and/or the like, can provide an estimated time of arrival for a delivery. Similarly, a service provider can provide an estimated time of arrival for providing a service, such as for providing an installation service, a repair service, a service activation, and/or the like. A driver of a vehicle can receive a route that identifies a set of service calls, which can be termed a set of jobs, that the driver is to perform, a fixed amount of time that each job is estimated to require, and a fixed amount of driving time that is estimated from each job to a subsequent job. When a driver is running late, the driver can call a customer to indicate that an initially provided estimated time of arrival is incorrect. For example, when a driver arrives at a first job 30 minutes late, the driver can call a customer associated with a second job to indicate that the driver expects to be 30 minutes late to the second job.

BRIEF DESCRIPTION OF THE DRAWINGS

FIG. 4 is a flow chart of an example process for dynamically updating an estimated time of arrival.

DETAILED DESCRIPTION OF PREFERRED EMBODIMENTS

Figure 1A:
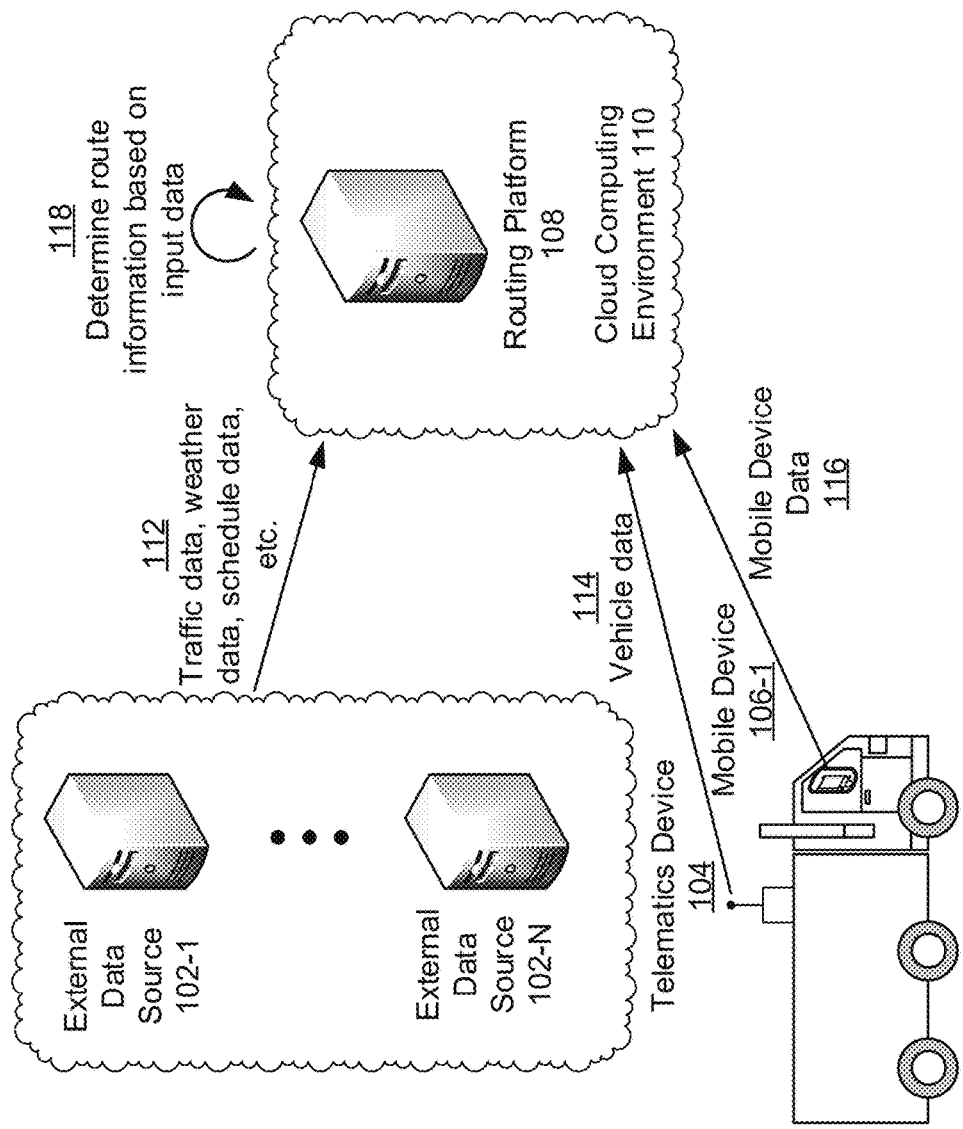
FIGS. 1A and 1B are diagrams of an overview of an example implementation described herein.

The following detailed description of example implementations refers to the accompanying drawings. The same reference numbers in different drawings can identify the same or similar elements.

A service provider can provide services to customers. To provide the services to the customers, the service provider can schedule a route of a set of jobs for the set of customers. For example, to install telecommunications services at a home of a customer, the service provider can schedule a route of a set of installation jobs that include a service technician driving to each customer's home and installing telecommunications equipment at each customer's home. Similarly, the service provider can schedule a route of a set of repair jobs, a set of upgrade jobs, a set of instructional jobs, and/or the like.

The service provider can determine a fixed period of time for each job, which can be termed a job period or a time on site, and a fixed period of time for transportation between jobs, which can be termed a transportation period or a drive time. For example, a service technician can receive a route identifying a first drive time to drive a service vehicle from a vehicle depot to a first job site, a first time on site to perform an installation at the first job site, a second drive time to drive to a second job site, a second time on site to perform a repair at the second job site, and a third drive time to drive back to a vehicle depot and return the service vehicle. The service provider can provide an estimated time of arrival to a first customer at the first job site and a second customer at the second job site. When the vehicle arrives at the first job site late by a particular amount of time, the service provider can shift the first time on site, the second drive time, the second time on site, and the third drive time by the particular amount of time, and can provide an update to the second customer indicating that the service technician will be late by the particular amount of time.

However, this can result in an inaccurate estimated time of arrival being provided to the second customer. For example, a change to traffic conditions between when the second drive time was routed for and when the second drive time actually occurs can result in reduced transportation time, increased transportation time, and/or the like. Moreover, other factors affecting a route for the service provider can alter based on the driver being late to the first job site, such as changes to weather conditions, changes to equipment availability, requirements that a driver be provided periodic breaks, and/or the like.

Some implementations, described herein, can provide vehicle tracking and dynamic estimated time of arrival determination. For example, a routing platform can communicate with a group of other devices to obtain data (e.g., real time data) relating to a location of an entity (e.g., a vehicle, a person, and/or the like), a status of a job, a traffic condition, a weather condition, and/or the like, and can dynamically update an estimated time of arrival for a set of appointments for the entity, such as a set of jobs that are to be completed by a driver of a vehicle.

Figure 1B:
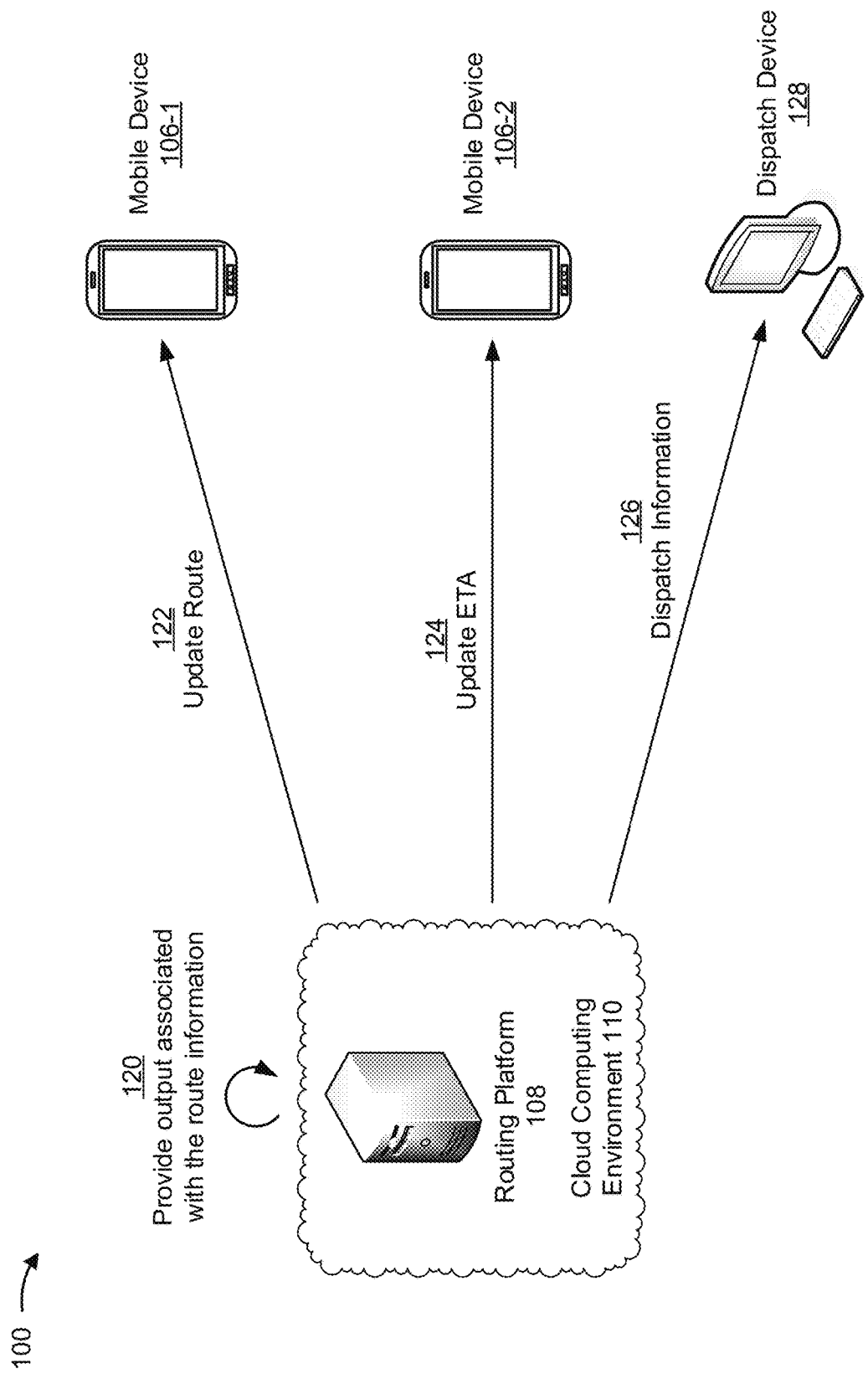

FIGS. 1A and 1B are diagrams of an overview of an example implementation 100 described herein. As shown in FIG. 1A, example implementation 100 can include a set of external data sources 102-1 through 102-N, a telematics device 104, one or more mobile devices 106 (e.g., mobile device 106-1), and a routing platform 108 operating in cloud computing environment 110.

As further shown in FIG. 1A, and by reference numbers 112 through 116, routing platform 108 can receive input data from a group of data sources. For example, routing platform 108 can receive data from the group of external data sources 102 identifying a traffic condition for a particular location, weather data for the particular location, routing data identifying a stored route for a vehicle, and/or the like. Additionally, or alternatively, routing platform 108 can receive vehicle data from telematics device 104, such as data identifying a location of the vehicle, a speed of the vehicle, a status of the vehicle (e.g., an engine status, vehicle location, vehicle alerts, vehicle sensor readings, vehicle speed, vehicle direction, vehicle geofence proximity, and/or status information from one or more other vehicle sensors of the vehicle), and/or the like. Additionally, or alternatively, routing platform can receive mobile device data from mobile device 106-1, such as data identifying a location of the vehicle, a location of a user of mobile device 106-1 (e.g., a driver of the vehicle), a status of a job, a path being mapped for the vehicle, a predicted path that a vehicle is to use, and/or the like.

As further shown in FIG. 1A, and by reference number 118, routing platform 108 can determine route information based on the input data. For example, routing platform 108 can determine a route for the vehicle (e.g., for the driver of the vehicle). In some implementations, routing platform 108 can determine an estimated time of arrival for the vehicle at one or more job sites for the driver of the vehicle. For example, based on information identifying a location of the vehicle, a status of the vehicle, a type of job that is to be completed by the driver of the vehicle (e.g., a length of the job), a schedule of availability of equipment that is to be obtained and used by the driver of the vehicle to complete a job, a current traffic condition, a predicted traffic condition, a current weather condition, a predicted weather condition, an availability of another driver and another vehicle to complete one or more jobs for the driver of the vehicle, and/or the like, routing platform 108 can determine the estimated time of arrival for at least one upcoming job. In some implementations, routing platform 108 can use a heuristic, conditional logic, a machine learning technique, a deep learning technique, a neural network technique, and/or the like to dynamically update the estimated time of arrival and/or automatically track a status of the vehicle and the driver. For example, routing platform 108 can use a heuristic to process input data and determine whether the driver has arrived at a job site.

As shown in FIG. 1B, and by reference number 120, routing platform 108 can provide output associated with the route information. As shown by reference number 122, routing platform 108 can provide output identifying an updated route to mobile device 106-1. For example, based on determining an updated estimated time of arrival based on the vehicle arriving at a job site late, a job taking less time than predicted, an item of equipment becoming available for the driver to borrow at an earlier time than expected, an accident causing a change to a traffic condition, a predicted rainstorm resulting in a predicted road closure, and/or the like, routing platform 108 can provide an updated route to the driver to identify an altered driving path for the driver, an altered estimated time of arrival for a job, an altered break schedule, an altered order of jobs, and/or the like. As shown by reference number 124, routing platform 108 can provide output identifying an updated estimated time of arrival to mobile device 106-2. For example, based on determining that the vehicle was 30 minutes late to a job site resulting in a shortened break during the job of 5 minutes less than routed for, and an altered traffic condition when the vehicle departs the job site 25 minutes after routed for, routing platform 108 can provide an estimated time of arrival of 45 minutes after routed for.

As further shown in FIG. 1B, and by reference number 126, routing platform 108 can provide an updated estimated time of arrival to a dispatch device 128 to enable a dispatcher to track the vehicle and/or alter a dispatch instruction (e.g., a route provided by the dispatcher). In this way, based on accounting for changes to multiple factors in a route, routing platform 108 can determine a non-fixed change to a route (e.g., a 30 minute late arrival at a first job site does not necessarily result in a 30 minute late departure from the first job site and a 30 minute late arrival at a second job site), thereby improving an accuracy of estimated times of arrival.

As indicated above, FIGS. 1A and 1B are provided merely as an example. Other examples are possible and can differ from what was described with regard to FIGS. 1A and 1B.

Figure 2A:
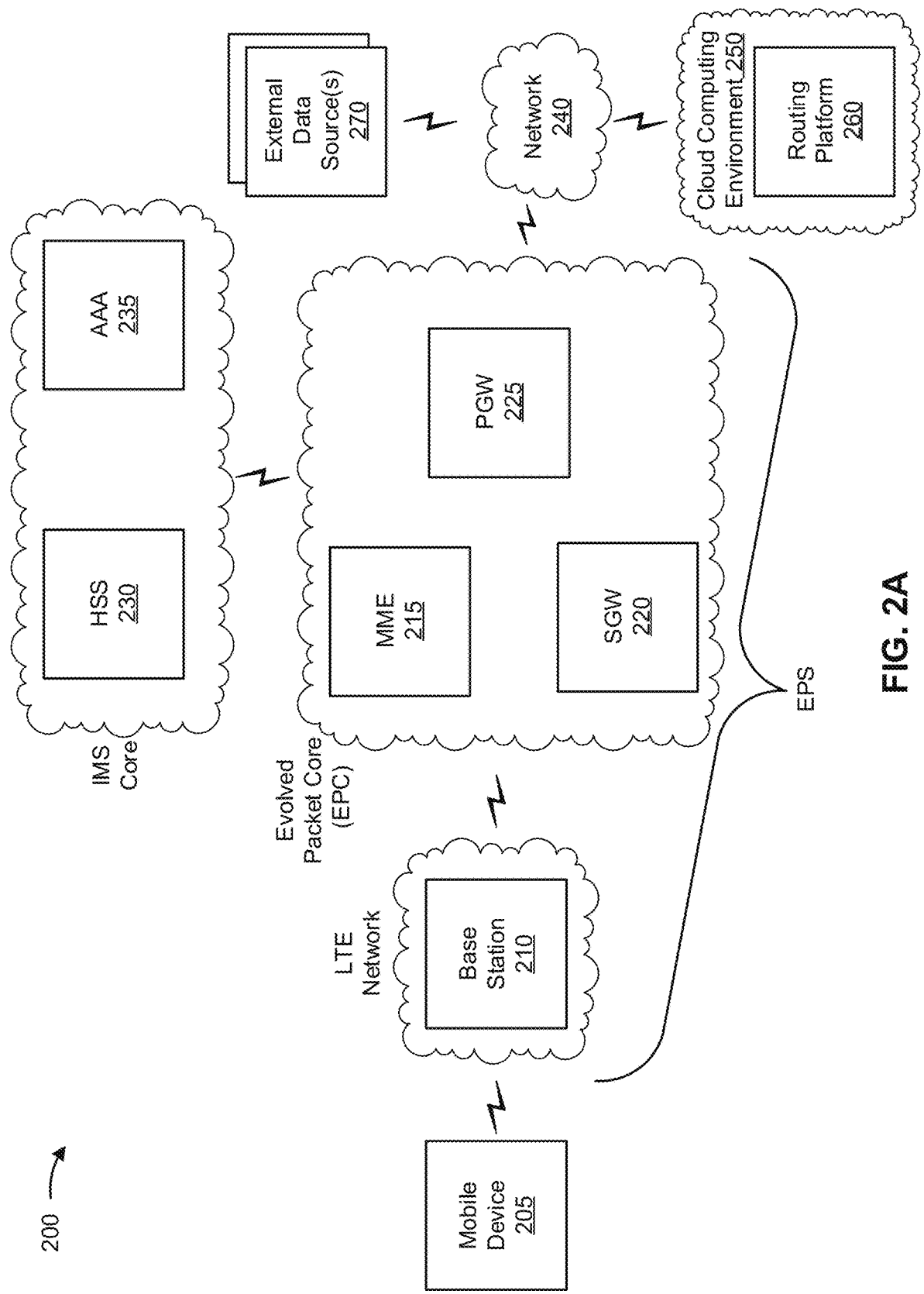
FIGS. 2A and 2B are diagrams of an example environment in which systems and/or methods, described herein, can be implemented.
Figure 2B:
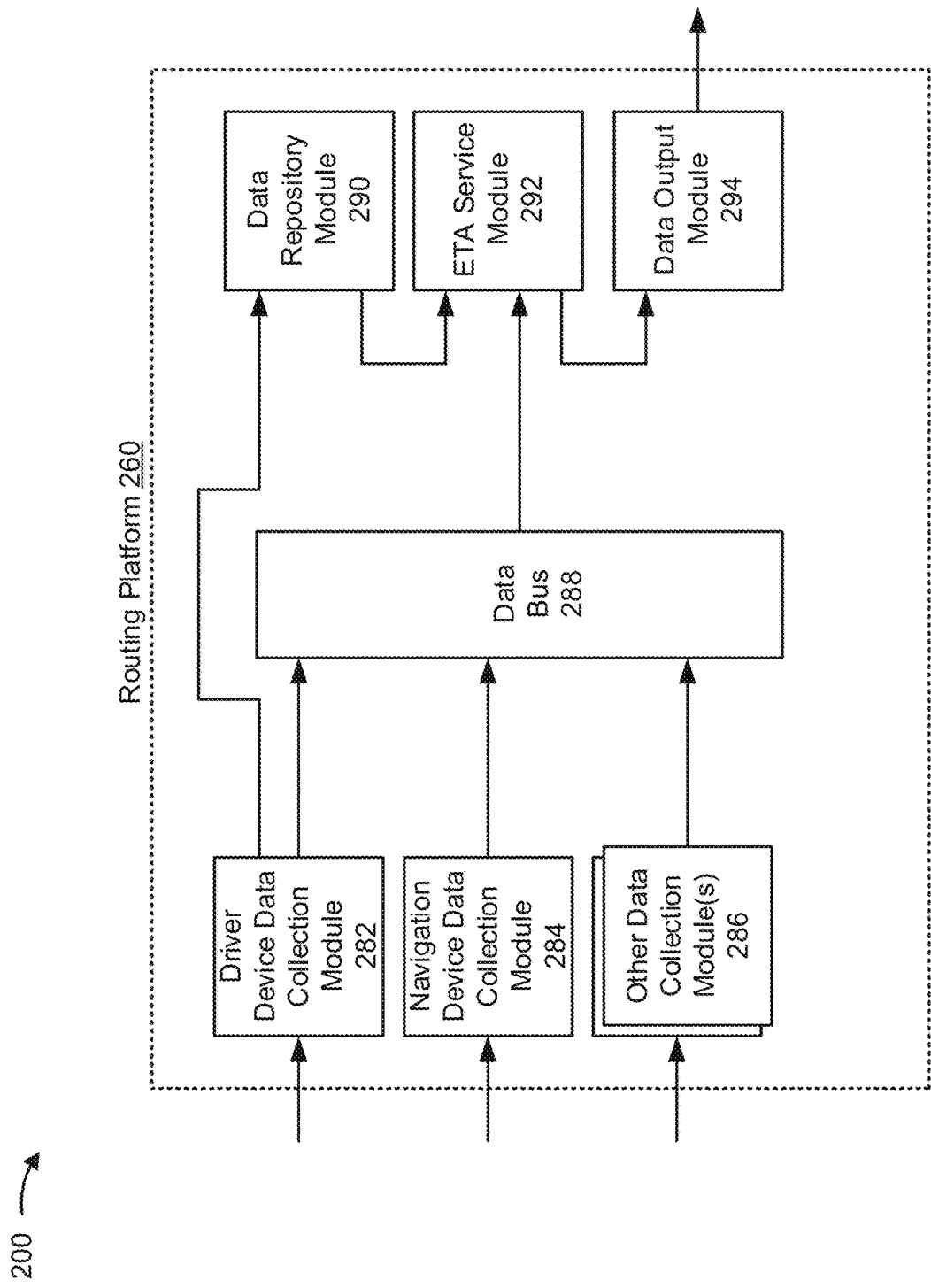

FIGS. 2A and 2B are diagrams of an example environment 200 in which systems and/or methods, described herein, can be implemented. As shown in FIG. 2A, environment 200 can include a mobile device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a network 240; a cloud computing environment 250; a routing platform 260; and one or more external data sources 270. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which mobile device 205 communicates with the EPC. The EPC can include MME 215, SGW 220, and/or PGW 225 that enable mobile device 205 to communicate with network 240 and/or an Internet protocol (IP) multimedia subsystem (IMS) core. The IMS core can include HSS 230 and/or AAA 235, and can manage device registration and authentication, session initiation, etc., associated with mobile devices 205. HSS 230 and/or AAA 235 can reside in the EPC and/or the IMS core.

Mobile device 205 can include one or more devices capable of communicating with base station 210 and/or a network (e.g., network 240). For example, mobile device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, a telematics device, a vehicle tracking device, a location tracking device, a machine type communications (MTC) device, an Internet of Things (IoT) device, a sensor device (e.g., a sensor device of a vehicle, such as an engine sensor, a window sensor, an airbag sensor, etc.), and/or a similar device. Mobile device 205 can send traffic to and/or receive traffic from network 240 (e.g., via base station 210, SGW 220, and/or PGW 225). In some implementations, mobile device 205 corresponds to telematics device 104, a mobile device 106, dispatch device 128, and/or the like shown in FIGS. 1A and 1B.

Base station 210 can include one or more devices capable of transferring traffic, such as audio, video, text, and/or other traffic, destined for and/or received from mobile device 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from mobile device 205 via an air interface. In some implementations, base station 210 can include a small cell base station, such as a base station of a microcell, a picocell, and/or a femtocell.

MME 215 can include one or more devices, such as one or more server devices, capable of managing authentication, activation, deactivation, and/or mobility functions associated with mobile device 205. In some implementations, MME 215 can perform operations relating to authentication of mobile device 205. Additionally, or alternatively, MME 215 can facilitate the selection of a particular SGW 220 and/or a particular PGW 225 to serve traffic to and/or from mobile device 205. MME 215 can perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 can select another MME (not pictured), to which mobile device 205 should be handed off (e.g., when mobile device 205 moves out of range of MME 215).

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to mobile device 205 via base station 210. Additionally, or alternatively, SGW 220 can perform operations associated with handing off mobile device 205 to and/or from an LTE network.

PGW 225 can include one or more devices capable of providing connectivity for mobile device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to mobile device 205 via SGW 220 and base station 210. PGW 225 can record data usage information (e.g., byte usage), and can provide the data usage information to AAA 235.

HSS 230 can include one or more devices, such as one or more server devices, capable of managing (e.g., receiving, generating, storing, processing, and/or providing) information associated with mobile device 205. For example, HSS 230 can manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 can include one or more devices, such as one or more server devices, that perform authentication, authorization, and/or accounting operations for communication sessions associated with mobile device 205. For example, AAA 235 can perform authentication operations for mobile device 205 and/or a user of mobile device 205 (e.g., using one or more credentials), can control access, by mobile device 205, to a service and/or an application (e.g., based on one or more restrictions, such as time-of-day restrictions, location restrictions, single or multiple access restrictions, read/write restrictions, etc.), can track resources consumed by mobile device 205 (e.g., a quantity of voice minutes consumed, a quantity of data consumed, etc.), and/or can perform similar operations.

Network 240 can include one or more wired and/or wireless networks. For example, network 240 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Cloud computing environment 250 includes an environment that delivers computing as a service, whereby shared resources, services, etc. can be provided to routing platform 260. Cloud computing environment 250 can provide computation, software, data access, storage, and/or other services that do not require end-user knowledge of a physical location and configuration of a system and/or a device that delivers the services. As shown, cloud computing environment 250 can include a routing platform 260. Although cloud computing environment 250 is described in terms of a cloud computing environment, computing resources allocated for routing platform 260 can be hosted using a server device, a non-cloud computing environment, and/or the like.

Cloud computing environment 250 can include a set of computing resources, which include one or more personal computers, workstation computers, server devices, or another type of computation and/or communication device. In some implementations, a computing resource can host routing platform 260. The cloud resources can include compute instances executing in a computing resource, storage devices provided in a computing resource, data transfer devices provided by a computing resource, etc. In some implementations, a computing resource can communicate with other computing resources via wired connections, wireless connections, or a combination of wired and wireless connections.

A computing resource can include a group of cloud resources, such as one or more applications, one or more virtual machines, virtualized storage, one or more hypervisors, or the like.

An application includes one or more software applications that can be provided to or accessed by routing platform 260. An application can eliminate a need to install and execute the software applications on routing platform 260. For example, an application can include software associated with routing platform 260 and/or any other software capable of being provided via cloud computing environment 250. In some implementations, a first application can send/receive information to/from one or more second applications, via a virtual machine.

A virtual machine includes a software implementation of a machine (e.g., a computer) that executes programs like a physical machine. A virtual machine can be either a system virtual machine or a process virtual machine, depending upon use and degree of correspondence to any real machine by a virtual machine. A system virtual machine can provide a complete system platform that supports execution of a complete operating system ("OS"). A process virtual machine can execute a single program, and can support a single process. In some implementations, a virtual machine can execute on behalf of a user (e.g., routing platform 260), and can manage infrastructure of cloud computing environment 250, such as data management, synchronization, or long-duration data transfers.

A virtualized storage includes one or more storage systems and/or one or more devices that use virtualization techniques within the storage systems or devices of a computing resource. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

A hypervisor provides hardware virtualization techniques that allow multiple operating systems (e.g., "guest operating systems") to execute concurrently on a host computer, such as a computing resource. A hypervisor can present a virtual operating platform to the guest operating systems, and can manage the execution of the guest operating systems. Multiple instances of a variety of operating systems can share virtualized hardware resources.

Routing platform 260 includes one or more devices capable of storing, processing, and/or routing information associated with determining an estimated time of arrival for an entity (e.g., a vehicle, a person, and/or the like). In some implementations, routing platform 260 can include one or more computing resources of cloud computing environment 250 instantiated and/or dynamically allocated for determining an estimated time of arrival. In some implementations, routing platform 260 can not be cloud based.

Although some implementations, described herein, are described in terms of an estimated time of arrival for a vehicle, some implementations described herein can be used to determine another type of route and/or for another type of entity, such as determining an estimated time of arrival for a package delivery, an arrival of a person, an arrival of data in a communications system, and/or the like.

External data source 270 includes one or more devices associated with receiving, generating, storing, processing, and/or providing information associated with determining an estimated time of arrival. For example, external data source 270 can include a server identifying a route for a set of vehicles, a schedule for availability of an item (e.g., equipment that is to be used to complete an installation, a service, a repair, and/or the like), a traffic condition, a weather condition, and/or the like. In some implementations, external data source 270 can include one or more sensors, such as one or more traffic sensors, weather sensors, location sensors, and/or the like. In some aspects, external data sources 270 can provide data in real-time or near real-time (e.g., within a threshold period of time of data collection, data acquisition, and/or the like).

As shown in FIG. 2B, routing platform 260 can include a driver device data collection module 282, a navigation device data collection module 284, one or more other data collection modules 286, a data bus 288, a data repository module 290, an estimated time of arrival (ETA) service module 292, and a data output module 294.

Driver device data collection module 282 includes one or more computing resources of cloud environment 250 implemented to obtain data from a driver device, such as a mobile device 205 assigned to a driver of a vehicle. In some implementations, driver device data collection module 282 can obtain data relating to a job status, such as a location of a driver, an estimated amount of time to complete a job based on a driver's assessment of the job, an update to the estimated amount of time to complete the job as the driver is completing the job, an indicator that a job is complete, an indicator that a driver is on a mandatory break (e.g., a break required by a contractual agreement, a legislative imperative, and/or the like), a non-mandatory break, and/or the like. In some implementations, driver device data collection module 282 can provide the data relating to the job status to data bus 288 and/or data repository 290.

Navigation device data collection module 284 includes one or more computing resources of cloud environment 250 implemented to obtain data from a navigation device, such as a mobile device 205 installed as a telematics device of a vehicle, a global positioning system (GPS) device of a vehicle, and/or the like. In some implementations, navigation device data collection module 284 can obtain data relating to a path (e.g., a set of directions being used by a driver to navigate to a job site), a deviation from a path (e.g., a change from an intended path to an actual path), an estimated time of arrival (e.g., calculated by the navigation device based on a path, a traffic condition, and/or the like), and/or the like. In some implementations, navigation device data collection module 284 can provide the data to data bus 288. For example, navigation device data collection module 284 can provide an update identifying a path of a vehicle.

Other data collection modules 286 include one or more computing resources of cloud environment 250 implemented to obtain data. For example, other data collection modules 286 can obtain data from mobile device 205, external data sources 270, and/or the like. In some implementations, data collection modules 286 can provide data to data bus 288.

Data bus 288 includes one or more computing resources of cloud environment 250 implemented to query and/or manage data interactions for routing platform 260. For example, data bus 288 can obtain data from data collection modules 282-286, and can distribute data to ETA service module 292 to enable ETA service module 292 to determine an updated estimated time of arrival for a vehicle. In some implementations, data bus 288 can provide data to other modules to perform other determinations, such as to determine a path, a change to a path, a change to a path, and/or the like.

Data repository 290 includes one or more computing resources of cloud environment 250 to store data. For example, data repository 290 can store data identifying a job status, a location of a vehicle, a location of equipment, and/or the like and can provide stored information to ETA service module 292 to enable a determination of an estimated time of arrival.

ETA service module 292 includes one or more computing resources of cloud environment 250 to determine an estimated time of arrival. For example, ETA service module 292 can apply machine learning, heuristics, conditional logic, and/or the like to determine an estimated time of arrival for a vehicle at one or more jobs with an improved accuracy relative to other techniques for determining an estimated time of arrival.

Data output module 294 includes one or more computing resources of cloud environment 250 to provide output based on a determination of routing platform 260. For example, data output module 294 can receive information from ETA service module 292 identifying an estimated time of arrival and can provide the information identifying the estimated time of arrival to mobile device 205 (e.g., a driver device, a navigation device, a customer device, a home smart hub device, a dispatcher device, and/or the like). In some implementations, data output module 294 can use hypertext transfer protocol (HTTP) push to provide output information. In some implementations, data output module 294 can use a location sharing system to provide the output information (e.g., to provide information identifying a location of a vehicle).

The number and arrangement of devices and networks shown in FIGS. 2A and 2B are provided as examples. In practice, there can be additional devices, modules, and/or networks, fewer devices, modules, and/or networks, different devices, modules, and/or networks, or differently arranged devices, modules, and/or networks than those shown in FIGS. 2A and 2B. Furthermore, two or more devices and/or modules shown in FIGS. 2A and 2B can be implemented within a single device and/or module, or a single device and/or module shown in FIGS. 2A and 2B can be implemented as multiple, distributed devices and/or modules. Additionally, or alternatively, a set of devices and/or modules (e.g., one or more devices and/or modules) of environment 200 can perform one or more functions described as being performed by another set of devices and/or modules of environment 200.

Figure 3:
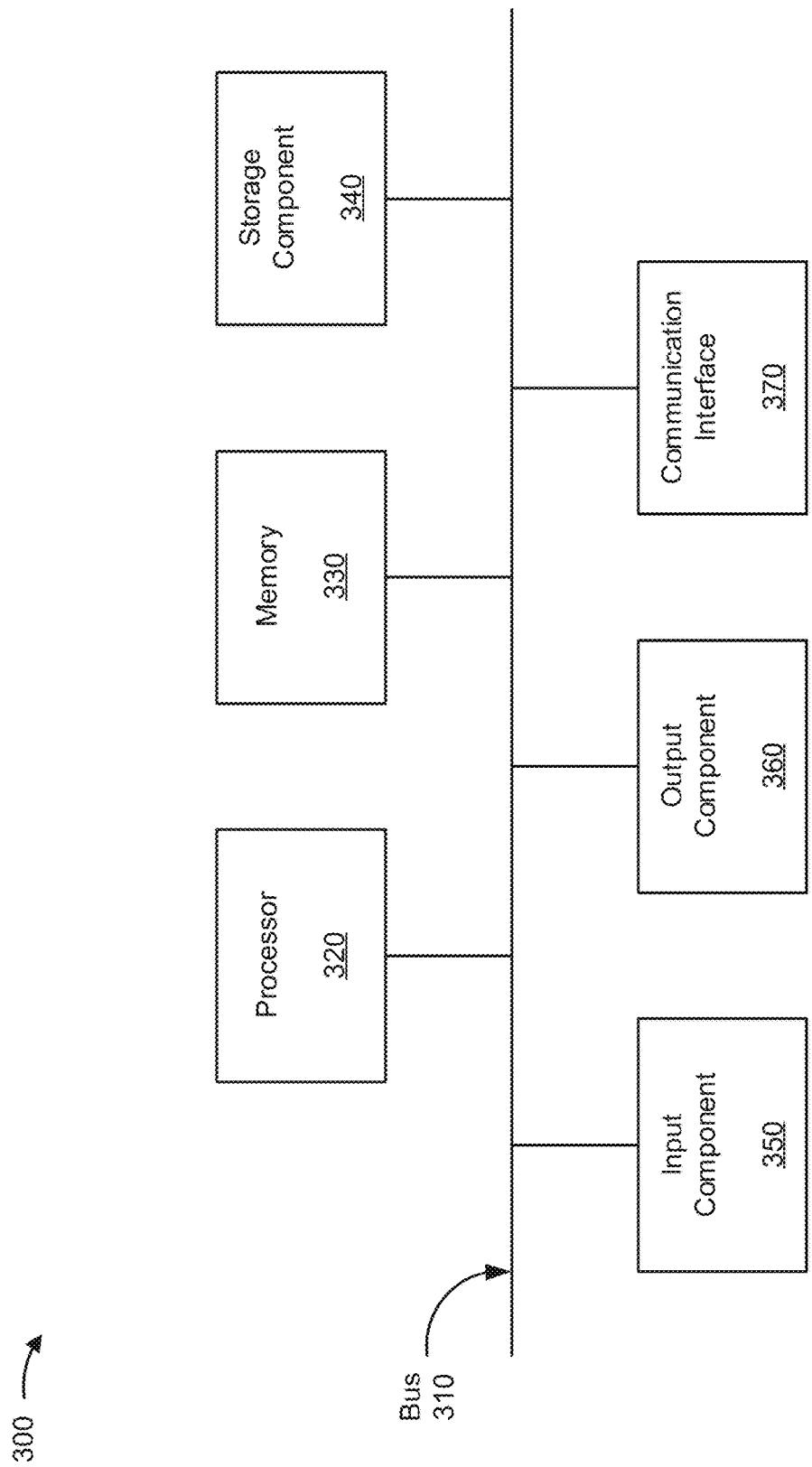
FIG. 3 is a diagram of example components of one or more devices of FIGS. 2A and 2B.

FIG. 3 is a diagram of example components of a device 300. Device 300 can correspond mobile device 205, base station 210, MME 215, SGW 220, PGW 225, HSS 230, AAA 235, routing platform 260, and/or external data source(s) 270. In some implementations, mobile device 205, base station 210, MME 215, SGW 220, PGW 225, HSS 230, AAA 235, routing platform 260, and/or external data source(s) 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for dynamically updating an estimated time of arrival. In some implementations, one or more process blocks of FIG. 4 can be performed by routing platform 260. In some implementations, one or more process blocks of FIG. 4 can be performed by another device or a group of devices separate from or including routing platform 260, such as mobile device 205, base station 210, MME 215, SGW 220, PGW 225, HSS 230, AAA 235, and/or external data source(s) 270.

As shown in FIG. 4, process 400 can include communicating with a set of devices to obtain input data from a set of data sources (block 410). For example, routing platform 260 can communicate with one or more mobile devices 205, one or more external data sources 270, and/or the like to obtain input data regarding an entity, such as a vehicle, a person, and/or the like. In some implementations, routing platform 260 can receive the input data based on a trigger, such as based on determining that a period of a route is exceeded, complete, ahead of what was routed for, behind what was routed for, and/or the like. In this way, routing platform 260 conserves processor, memory, and/or network resources based on avoiding data collection and processing unless the trigger is satisfied. Additionally, or alternatively, routing platform 260 can receive the input data based on requesting the input data, based on the input data being generated (e.g., by mobile device 205), based on a periodic schedule (e.g., once per second, once per minute, once per hour, once per day, etc.), and/or the like. In some implementations, routing platform 260 can receive estimate information. For example, routing platform 260 can obtain stored information identifying an initial estimate of a job duration, a drive time duration, and/or the like. Additionally, or alternatively, routing platform 260 can generate the initial estimate based on received information.

In some implementations, the input data may include telematics data relating to a state of a vehicle and navigation data relating to a state of an operator of the vehicle. For example, the telematics data may include data identifying geofence breaks, a vehicle state, and/or the like, which may be compared to a ruleset or heuristic to determine a state of a vehicle. As another example, the navigation data my include an operator location (e.g., an operator of a vehicle, such as a driver), an operator status, and/or the like, which may be used to determine a state of the operator.

In some implementations, routing platform 260 can receive input data (e.g., real-time data), such as from external data source 270, identifying a weather condition, a traffic condition, and/or the like. For example, routing platform 260 can receive input data identifying a past weather condition, a current weather condition, a predicted future weather condition, a past traffic condition, a current traffic condition, a predicted future weather condition, and/or the like. In some implementations, routing platform 260 can obtain path information, such as from a mapping application of mobile device 205 being used by a driver, an external data source 270 storing a path for the driver, and/or the like. For example, routing platform 260 can obtain the path, and can communicate with external data source 270 to obtain traffic data and weather data relating to the path, thereby reducing network traffic, a memory resource utilization, a processing resource utilization, and/or the like relative to obtaining data regarding a large geographic area that includes the path.

In some implementations, routing platform 260 can receive data relating to a non-mapped path. For example, for a job associated with a site of a threshold size and where the vehicle is to travel across the site on a non-mapped path (e.g., in a parking lot, in an open area with a telecommunications pole, and/or the like), routing platform 260 can obtain information identifying a distance from a mapped path to a destination to enable estimation of a time to traverse the non-mapped path from the mapped path to the destination.

In some implementations, routing platform 260 can receive data identifying a route. For example, routing platform 260 can determine a set of jobs that are to be completed by a driver of a particular vehicle, a group of drivers of a group of vehicles, and/or the like. In some implementations, routing platform 260 can receive data identifying a type of job, a period of time estimated to complete the type of job, a break requirement for a driver of the vehicle, and/or the like.

In some implementations, routing platform 260 can receive data identifying a location of the driver, a location of the vehicle, a status of the vehicle, and/or the like. For example, routing platform 260 can receive data indicating that the driver is riding public transportation to a vehicle depot, and can communicate with external source 270 to obtain route information relating to the public transportation vehicle to estimate a time of arrival of the driver at the vehicle depot, thereby enabling a determination of an estimated time of arrival at a first job site before the driver has arrived at the vehicle depot. In some implementations, routing platform 260 can select from a set of available data sources. For example, routing platform 260 can obtain location information for a vehicle from a telematics device (e.g., a first mobile device 205) when an engine of the vehicle is on, thereby reducing utilization of battery resources of a driver's user equipment (e.g., a second mobile device 205). In this case, based on receiving data indicating that the engine is turned off, routing platform 260 can communicate with the second mobile device 205 to obtain location data, thereby enabling determination of a location when the vehicle is not running. In some implementations, routing platform 260 can receive information identifying a characteristic of a vehicle from, for example, a telematics device. For example, routing platform 260 can receive information identifying a weight of a vehicle, a height of a vehicle, a cargo of a vehicle, and/or the like. In this way, routing platform 260 can enable adjustment of an estimated time of arrival based on a path adjustment relating to a weight restriction, a height restriction, a cargo restriction, and/or the like for a roadway.

In some implementations, routing platform 260 can receive data based on providing a user interface (e.g., via mobile device 205). For example, routing platform 260 can cause a user interface to be provided for display via mobile device 205 to receive input from a driver indicating a status of a job, and can receive the input enabling a more granular determination of when a job will be completed relative to using fixed estimates based on the type of job. Similarly, routing platform 260 can receive information from mobile device 205 indicating that a driver is taking a break, attempting to locate an item, attempting to place a call, and/or the like.

In this way, routing platform 260 can communicate with a set of devices to obtain input data from a set of data sources.

As further shown in FIG. 4, process 400 can include processing the input data to determine a state of a job (block 420) and processing the input data to determine an estimated time of arrival (block 430). For example, routing platform 260 can process the input data to determine the state of a first job, of a set of jobs, based on the state of a vehicle and/or a state of an operator of the vehicle, and may determine an estimated time of arrival for the first job, a downstream job after the first job, and/or the like. In some implementations, routing platform 260 can process the input data using a heuristic model of path duration. For example, routing platform 260 can use a heuristic algorithm to process a data set of past paths, past jobs, past traffic data, past weather patterns, and/or the like to generate a model of path duration. Routing platform 260 can divide historical data in training data and testing data, and can use the training data to develop one or more heuristic rules for the heuristic model of path duration, and can test the one or more heuristic rules using the testing data. Based on the heuristic model satisfying a threshold accuracy in predicting path duration, the heuristic model can be deployed by routing platform 260 to calculate path durations. In this case, routing platform 260 can use the input data and the heuristic model to determine an estimated job duration, an estimated transportation duration, an estimated break duration, and/or the like, and can determine an estimated time of arrival at each job of a route for a driver. In some implementations, routing platform 260 can update an estimated time of arrival. For example, routing platform 260 can determine, based on a first estimated time of arrival and an alteration to the input data from previously collected input data, a second estimated time of arrival that is different from the first estimated time of arrival. In this way, routing platform 260 dynamically determines an estimated time of arrival to enable enhanced vehicle tracking by a dispatcher, a customer, and/or the like.

In some implementations, routing platform 260 may determine estimated times of arrival that are different from an initial plurality of estimated times of arrival. For example, routing platform 260 may determine a first estimated time of arrival for a job before a beginning of a route, and may subsequently re-determine the estimated time of arrival for the job during the route (e.g., based on a state of an upstream job before the job). In this case, routing platform 260 may determine that the estimated time of arrival is different than the first estimated time of arrival, and may determine to transmit an alert (e.g., to a customer mobile device 205). In some implementations, routing platform 260 may determine that the estimated time of arrival is different based on a heuristic. For example, routing platform 260 may determine that the estimated time of arrival is different based on determining that a mandatory type of driver break is to occur before the job rather than after the job, and the job will be delayed by a length of time corresponding to the mandatory type of driver break. In contrast, for a non-mandatory type of driver break, routing platform 260 may determine that an operator will reduce a length of time of the non-mandatory type of driver break to avoid being late to the job. Additionally, or alternatively, routing platform 260 may determine that the estimated time of arrival is different based on a predicted traffic condition, a predicted equipment availability, and/or the like associated with a state of the vehicle or a state of the operator.

In some implementations, routing platform 260 can process the input data as a batch process. For example, periodically (e.g., once per hour, once per minute, etc.), routing platform 260 can process the input data to determine the route information for one or more jobs, one or more vehicles, and/or the like. Additionally, or alternatively, routing platform 260 can process the input data continuously as updated input data is received. For example, when a change to a predicted traffic pattern for a subsequent drive time is received, routing platform 260 can recalculate the estimated time of arrival based on the predicted traffic pattern.

In some implementations, routing platform 260 can determine an arrival window for a job when processing the input data. For example, routing platform 260 can determine an earliest expected arrival time and a latest expected arrival time for a particular job. In this case, routing platform 260 can filter stops not within the arrival window (e.g., break stops, gasoline stops, equipment malfunction stops, etc.), thereby reducing a likelihood of a false positive determination of a stop as being at the arrival site (e.g., when location data for a vehicle is unavailable). In some implementations, routing platform 260 can process the input data to automatically determine a status of a route. For example, routing platform 260 can use a geofencing technique to automatically determine when a vehicle has arrived at a job (e.g., a particular state of the vehicle), has departed a job, and/or the like. For example, routing platform 260 may determine whether a vehicle is within a geofence, whether a vehicle has crossed a geofence, whether a vehicle is within a threshold proximity of a geofence, and/or the like, and may determine a state of the vehicle based on the geofence. In this way, routing platform 260 may automatically determine arrival of a vehicle, departure of a vehicle, off-path travel of a vehicle (e.g., travel not on a predicted or instructed path), off road travel of a vehicle (e.g., travel on non-mapped roads or on-property of a job), and/or the like.

In some implementations, routing platform 260 can utilize conditional logic to determine whether a job is initiated or completed, which may correspond to a state of the job. For example, routing platform 260 can automatically determine completion of a job based on input data identifying an arrival at a job site, an ignition switch off at the job site, the vehicle remaining at the job site within a threshold amount of time of an expected job length, and/or the like. In this way, routing platform 260 uses conditional logic to reduce a likelihood that a false positive determination of job initiation or completion results in an incorrect estimated time of arrival. Similarly, routing platform 260 can automatically determine whether a break will be shortened (e.g., which may relate to a state of an operator, such as a driver) using conditional logic, such as based on whether the break is a mandatory break (e.g., a legally obligated or contractually obligated break), which will not be shortened, or a non-mandatory break, which can be shortened, thereby improving an accuracy of an estimated time of arrival determination relative to another technique that does not distinguish between types of breaks and/or does not account for changes to non-mandatory breaks to ensure timeliness. In some implementations, routing platform 260 can transmit an instruction regarding a shortening of a break based on determining an estimated time of arrival.

In some implementations, routing platform 260 can use a heuristic for out of order arrivals in determining multiple estimated times of arrivals and/or a state of a particular job. For example, when a job list includes a set of jobs A, B, and C, and jobs A and C are at the same location, routing platform 260 can reject an automatic determination of arrival at job C until after job B is complete. Additionally, or alternatively, routing platform 260 can determine to automatically alter a route to cause jobs A and C to occur before job B to reduce an amount of transportation time. In some implementations, routing platform 260 can determine out of order job arrival based on a path. For example, when multiple job locations overlap (e.g., a threshold distance that is used for determining arrival results in overlapping areas for multiple job locations), routing platform 260 can use input data identifying a direction of travel, a path being identified in a navigation application of mobile device 205, and/or the like to determine at which of the multiple job locations the vehicle is arriving.

In some implementations, routing platform 260 can identify a late job state. For example, based on the input data, routing platform 260 can determine that a job is late. Additionally, or alternatively, routing platform 260 can determine that a job is predicted to be late. For example, routing platform 260 can determine that, based on a predicted traffic condition based on historical traffic conditions, a predicted weather condition, a predicted job length, a location of a vehicle, and/or the like, a subsequent job is behind what is routed for (e.g., is predicted to start late, end late, and/or the like). In some implementations, routing platform 260 can determine that a vehicle is off path (e.g., is greater than a threshold distance from an expected path, a planned path, an indicated path, and/or the like).

In some implementations, routing platform 260 can identify an incorrect order for a group of jobs. For example, routing platform 260 can determine that a job that occurs after a job that the job is intended to occur before is out of order. In some implementations, routing platform 260 can determine that a particular job is not out of order. For example, routing platform 260 can determine that a depot job (e.g., obtaining a vehicle from a vehicle depot for subsequent jobs) is not out of order even when a mobile device 205 of a driver is detected within a threshold of a job site that is to occur after picking up the vehicle. In this way, routing platform 260 automatically accounts for a driver passing near a job site before starting work, thereby reducing the likelihood of false positive job initiation determinations.

In some implementations, routing platform 260 can identify an initiation of a path (e.g., a group of multiple jobs). For example, based on detecting mobile device 205 at a vehicle depot (e.g., a state of the operator being at the vehicle depot), routing platform 260 can determine that the path is initiated. Additionally, or alternatively, routing platform 260 can determine that the path is complete. For example, based on each job being determined to complete, a vehicle determined to have returned to a vehicle depot, an idle time of the vehicle being greater than a threshold at the vehicle depot (e.g., a state of the vehicle being an idle state), and/or the like, routing platform 260 can determine that the path is completed. In some implementations, routing platform 260 can determine that the vehicle left the vehicle depot to determine path completion, thereby reducing a false positive when the vehicle has remained in the depot for greater than a threshold period of time without leaving the vehicle depot.

In some implementations, routing platform 260 can determine a travel distance of a vehicle based on the input data. In some implementations, routing platform 260 can determine a difference between a travel distance and an expected distance (e.g., a shortest path distance between jobs of a group of jobs). In some implementations, routing platform 260 can determine a dispatch estimated time of arrival. For example, routing platform 260 can determine an estimated time between dispatching a vehicle to complete a job and the vehicle arriving at the job (e.g., based on a quantity of intervening jobs, a traffic condition, a weather condition, a historical driver characteristic, such as a historical driver average speed or a historical driver likelihood of correctly following an assigned path, etc.). In some implementations, routing platform 260 can alter an estimated time of arrival based on an out of order job arrival. For example, routing platform 260 can automatically rearrange a route after detecting an out of order job arrival, and can update the estimated time of arrival based on the rearranged route.

In some implementations, routing platform 260 can perform path post-processing. For example, routing platform 260 can adjust an expected job time, an estimated time of arrival, and/or the like after completion of a path, thereby reducing a likelihood that overlapping job sites result in a vehicle being determined to be onsite at multiple locations concurrently, and data regarding time on site for each job is incorrectly logged. In this way, routing platform 260 can override erroneous data determined during a path to more accurately identify a set of incidents during a route (e.g., jobs, job site arrivals, breaks, etc.), for use in post-path employee tracking. In this case, routing platform 260 can use one or more heuristics for identifying erroneous data (e.g., based on an order of statuses of a vehicle not matching an expected order of statuses, based on transportation times or job times differing from expected times by greater than a threshold, and/or the like).

In some implementations, routing platform 260 can implement one or more performance improvement techniques. For example, routing platform 260 can reject calculation of a path greater than a threshold distance, storing a path time associated with greater than a threshold size variable for storage, and/or the like, thereby improving computing performance of routing platform 260. In this case, routing platform 260 can automatically break a path into multiple smaller paths, break a time period into multiple smaller time increments, and/or the like. In some implementations, routing platform 260 can calculate a predicted mileage for a vehicle based on the input data. In some implementations, routing platform 260 can automatically generate a job for a vehicle. For example, based on routing platform 260 determining that a job was missed during a path, routing platform 260 can generate another job to replace the job, and can assign the job to another vehicle.

In some implementations, routing platform 260 may determine an estimated time of arrival based on a characteristic of a job. For example, routing platform 260 may determine that a particular type of job is associated with a particular length of time to completion, and may determine an estimated time of arrival based on the particular length of time to completion. In some implementations, routing platform 260 may determine an estimated time of arrival based on a characteristic of a vehicle. For example, routing platform 260 may determine a path for a vehicle based on a height, a weight, a cargo type (e.g., presence of hazardous materials), a maximum speed, a road classification, a turn radius, and/or the like, and may determine the estimated time of arrival based on the path. In some implementations, routing platform 260 may determine a path to ensure right side routing (e.g., that the vehicle is on a correct side of a street for a job, such as when a vehicle is to park at a job site and is unable to perform a u-turn at the job site based on a size of the vehicle and a size of a road). In some implementations, routing platform 260 may determine an estimated time of arrival based on a road use constraint. For example, a road may be associated with particular types of vehicles, particular subsets of vehicles (e.g., odd numbered license plates on odd numbered days, even numbered license plates on even numbered days, etc.), and/or the like.

In this way, routing platform 260 can process the input data to determine route information.

As further shown in FIG. 4, process 400 can include determining an alert or a response action (block 430). For example, routing platform 260 can process the route information to determine the alert or the response action relating to the estimated time of arrival. In some implementations, routing platform 260 can process the route information and determine that an alert is to be provided regarding an estimated time of arrival. For example, when generating an initial route for a vehicle, routing platform 260 can determine to transmit a set of alerts to a set of customers identifying estimated times of arrival for a set of jobs for the set of customers. Based on automatically generating an initial route and transmitting alerts, routing platform 260 reduces operator time, computing resources (e.g., used by the operator), and/or the like. Additionally, or alternatively, when routing platform 260 determines that an estimated time of arrival has changed, such as by a threshold amount, routing platform 260 can determine to transmit an alert identifying the change to the estimated time of arrival. In some implementations, routing platform 260 can identify a group of mobile devices 205 to which to transmit the alert. For example, routing platform 260 can identify a first mobile device 205 for a customer, a second mobile device 205 for a driver, a third mobile device 205 for a dispatcher, and/or the like to which to transmit the alert.

In some implementations, routing platform 260 may obtain updated input information. For example, after a threshold period of time elapses, routing platform 260 may update the input information to recalculate the route information. Additionally, or alternatively, routing platform 260 may predict a location of a vehicle based on a previous location of a vehicle, a speed of the vehicle, and an amount of time from a previous update of the location of the vehicle (e.g., using a dead reckoning technique).

In some implementations, routing platform 260 can determine to alter a route based on the routing information. For example, routing platform 260 can determine to add a job to a route (e.g., based on determining that a vehicle is ahead of what was routed for), remove a job from a route (e.g., based on determining that a vehicle is behind what was routed for), alter an order of jobs in a route (e.g., based on a change to a traffic condition, an equipment availability, a docking bay availability, a parking availability, and/or the like), dispatch another vehicle to fulfill a job in the route, and/or the like. In some implementations, routing platform 260 can determine to alter a path based on an estimated time of arrival. For example, when an estimated time of arrival is determined to be after a threshold time associated with a change to a reversible lane or road (e.g., identified based on the input data), routing platform 260 can determine to change a path for a vehicle based on the change to the reversible lane or road. Similarly, when an estimated time of arrival results in a service hours period (e.g., hours of service during which a job may occur) being exceeded, routing platform 260 can alter the route to avoid the service hours period being exceeded.

In some implementations, routing platform 260 can determine to store log data regarding the route based on determining the route. For example, routing platform 260 can determine to store vehicle data, traffic data, job data (e.g., a prediction of an amount of time to complete a job), and/or the like for utilization in a subsequent route determination. In some implementations, routing platform 260 can determine to automatically perform a customer relations task. For example, based on determining that an estimated time of arrival exceeds a threshold (e.g., a threshold corresponding to a service window), routing platform 260 can determine to automatically offer a discount, a credit, a service upgrade, and/or the like to a customer as compensation for the estimated time of arrival exceeding the threshold.

In this way, routing platform 260 can process the route information to determine an alert or a response action.

As further shown in FIG. 4, process 400 can include communicating with a device to transmit the alert or implement the response action (block 440). For example, routing platform 260 can transmit the alert to a mobile device 205, an external data source 270, and/or the like, and/or communicate with a mobile device 205, an external data source 270, and/or the like to implement the response action. In some implementations, routing platform 260 can communicate with a vehicle (e.g., a control device type of mobile device 205) to cause an autonomous vehicle to be dispatched, to change a path, to provide updated status information, and/or the like. In some implementations, routing platform 260 can cause the alert to be provided for display in a user interface of mobile device 205. For example, routing platform 260 can provide an alert identifying a change to an estimated time of arrival, and can cause the alert to be provided for display to notify a customer of the change to the estimated time of arrival. In some implementations, routing platform 260 can alter a route of jobs and provide information identifying the alteration to the route of jobs. In some implementations, routing platform 260 can cause a change to a path to be provided for display, can cause another vehicle to be dispatched, can automatically perform a customer relations task, can cause a calendar entry to be generated and/or updated in a calendar application of mobile device 205, and/or the like. In some implementations, based on tracking a location of a vehicle, routing platform 260 can provide information identifying a distance of a vehicle to a job site to a customer on the job site (e.g., to mobile device 205) to enable the customer to provide directions to the driver for a non-mapped path from a road to a location on the job site. Additionally, or alternatively, routing platform 260 can communicate with a mobile device 205 to dispatch a drone vehicle to deliver a part or a package, provide a path to a drone vehicle, provide delivery instructions to a drone vehicle, adjust an account of a customer based on a change to an estimated time of arrival, request that a customer be at a location to meet an arriving vehicle, populate a navigation system with updated directions, and/or the like. In some implementations, routing platform 260 may update a map based on a location of the vehicle, data identifying a speed of the vehicle (e.g., to correct an incorrectly identified speed limit on the map), and/or the like.

In this way, routing platform 260 can communicate with a device to transmit the alert or implement the response action.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, routing platform 260 enables increased granularity and/or accuracy in an estimated time of arrival determination for an entity, such as a vehicle, a person, and/or the like relative to utilizing static time periods to determine an estimated time of arrival. In this way, vehicles can be dispatched more efficiently, service calls can be more likely to be completed in a time that was routed for the service calls, and/or the like, thereby reducing resource utilizations associated with the vehicles, associated with systems being serviced by drivers of the vehicles, associated with equipment that is to be assigned to vehicles, and/or the like relative to less accurate estimated time of arrival determinations. Moreover, based on using heuristics and conditional logic in automatically determining the estimated time of arrival, a likelihood of inaccurate determinations is reduced relative to other techniques, thereby increasing accuracy, reducing a likelihood of false positive determinations, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors, operatively connected to the memory, to:
communicate, via a wireless network, with a set of devices to obtain input data from a set of data sources,
wherein the set of devices includes a mobile device and a telematics device of a vehicle;
determine, based on receiving data including a status of an engine of the vehicle from the set of data sources, whether the engine is on or off,
wherein the data is received via the wireless network;
selectively communicate with, via the wireless network and based on determining whether the engine is on or off, the telematics device or the mobile device to obtain the input data;
process the input data to determine a state of a first job, of a plurality of jobs, based on a state of the vehicle and a state of an operator of the vehicle taken from the input data,
wherein processing the input data comprises:
determining a window of an expected arrival time associated with the first job; and
filtering a portion of the input data that is not within the window;
determine, based on the state of the first job, a plurality of estimated times of arrival of the vehicle at two or more downstream jobs, of the plurality of jobs, occurring after the first job,
wherein the plurality of estimated times of arrival are determined to be different from an initial plurality of estimated times of arrival, and
wherein at least one different estimated time of arrival, of the plurality of estimated times of arrival, is determined to be different using a heuristic relating to at least one of a driver break, a traffic condition, or an equipment availability identified based at least in part on the state of the vehicle or the state of the operator;
determine, based on the plurality of estimated times of arrival, a set of alerts or a set of response actions relating to the plurality of estimated times of arrival of the vehicle; and
communicate, via the wireless network, with at least one customer device associated with at least one of the two or more downstream jobs to provide an alert of the set of alerts or implement a response action of the set of response actions,
wherein the communicating with the at least one customer device comprises transmitting information identifying an estimated time of arrival of the plurality of estimated times of arrival.

2. The device of claim 1, wherein the one or more processors, when determining the state of the first job, are configured to:
determine the state of the vehicle using another heuristic relating to identifying a location of the vehicle relative to the first job based on a geofence.

3. The device of claim 1, wherein the one or more processors, when determining the state of the first job, are configured to:
determine the state of the vehicle using another heuristic relating to automatically identifying a departure of the vehicle from a location of the first job.

4. The device of claim 1, wherein the one or more processors, when determining the state of the first job, are configured to:
determine the state of the vehicle using another heuristic relating to automatically determining that the vehicle is not on a predicted path from a first location of the first job to a second location of at least one of the two or more downstream jobs.

5. The device of claim 1, wherein the one or more processors, when determining the state of the first job, are configured to:
  determine the equipment availability for use at a location associated with at least one of the two or more downstream jobs.

6. The device of claim 1, wherein the one or more processors are further configured to:
  determine, after determining the plurality of estimated times of arrival and without receiving follow-up input data from the set of devices, another plurality of estimated times of arrival based on an estimated job state;
  determine another alert based on the estimated job state; and
  communicate with the at least one customer device to provide the other alert.

7. The device of claim 1, wherein the one or more processors are further configured to:
  divide historical data into training data and testing data, wherein the historical data includes a data set including information associated with at least one of:
    a past path,
    a past job,
    a past traffic data, or
    a past weather pattern;
  use the training data to develop one or more heuristic rules for a heuristic model of path duration;
  deploy, based on the heuristic model satisfying a threshold accuracy in predicting path duration, the heuristic model to calculate one or more path durations; and
  use the input data and the heuristic model to determine at least one of:
    an estimated job duration,
    an estimated transportation duration,
    an estimated break duration, or
    an estimated time of arrival at each job of a route for a driver.

8. The device of claim 1, wherein the one or more processors, when processing the input data to determine the state of the first job, are configured to:
  determine, based on determining that the vehicle was in an idle state at a particular location for a period time that is greater than a threshold, that the first job is complete.

9. A non-transitory computer-readable medium storing instructions, the instructions comprising:
  one or more instructions that, when executed by one or more processors, cause the one or more processors to:
    communicate, via a wireless network, with a set of devices to obtain input data from a set of data sources,
      wherein the set of devices includes a mobile device and a telematics device of a vehicle;
    determine, based on receiving data including a status of an engine of the vehicle from the set of data sources, whether the engine is on or off,
      wherein the data is received via the wireless network;
    selectively communicate with, via the wireless network and based on determining whether the engine is on or off, the telematics device or the mobile device to obtain the input data;
    process the input data to determine a state of a first job, of a plurality of jobs, based on a state of the vehicle and a state of an operator of the vehicle taken from the input data,
      wherein processing the input data comprises:
        determining a window of an expected arrival time associated with the first job; and
        filtering a portion of the input data that is not within the window;
    determine, based on the state of the first job, a plurality of estimated times of arrival of the vehicle at two or more downstream jobs, of the plurality of jobs, occurring after the first job,
      wherein the plurality of estimated times of arrival are determined to be different from an initial plurality of estimated times of arrival, and
      wherein at least one different estimated time of arrival, of the plurality of estimated times of arrival, is determined to be different using a heuristic relating to at least one of a driver break, a traffic condition, or an equipment availability identified based at least in part on the state of the vehicle or the state of the operator;
    determine, based on the plurality of estimated times of arrival, a set of alerts or a set of response actions relating to the plurality of estimated times of arrival of the vehicle; and
    communicate, via the wireless network, with at least one customer device associated with at least one of the two or more downstream jobs to provide an alert of the set of alerts or implement a response action of the set of response actions,
      wherein the communicating with at least one customer device comprises transmitting information identifying an estimated time of arrival of the plurality of estimated times of arrival.

10. The non-transitory computer-readable medium of claim 9, wherein the one or more instructions, that cause the one or more processors to determine the plurality of estimated times of arrival, cause the one or more processors to:
  determine the plurality of estimated times of arrival based on at least one of:
    a vehicle height,
    a vehicle weight,
    a vehicle turn radius,
    a vehicle cargo type,
    a road classification,
    an equipment availability,
    a docking bay availability, or
    a parking availability.

11. The non-transitory computer-readable medium of claim 9, wherein the one or more instructions, that cause the one or more processors to communicate with the at least one customer device, cause the one or more processors to:
  provide information identifying an alteration to an order of the two or more downstream jobs.

12. The non-transitory computer-readable medium of claim 9, wherein the one or more instructions, that cause the one or more processors to determine the plurality of estimated times of arrival, cause the one or more processors to:
  determine the plurality of estimated times of arrival using another heuristic relating to automatically identifying arrival of the vehicle at a location.

13. The non-transitory computer-readable medium of claim 9, wherein the one or more instructions, that cause the one or more processors to determine the state of the first job, cause the one or more processors to:
  determine the state of the vehicle using another heuristic relating to identifying a location of the vehicle relative to the first job based on a geofence.

14. The non-transitory computer-readable medium of claim 9, wherein the one or more instructions, that cause the one or more processors to determine the state of the first job, cause the one or more processors to:
estimate an amount of time remaining to complete the first job based on the state of the vehicle or the state of the operator.

15. The non-transitory computer-readable medium of claim 9, wherein the one or more instructions, that cause the one or more processors to determine the plurality of estimated times of arrival, cause the one or more processors to:
determine the plurality of estimated times of arrival based on estimating an alteration to a first type of break and no alteration to a second type of break,
the first type of break and the second type of break being scheduled for a period of time concurrent with the two or more downstream jobs.

16. A method, comprising:
communicating, by a device and via a wireless network, with a set of devices to obtain input data from a set of data sources,
wherein the set of devices includes a mobile device and a telematics device of a vehicle;
determining, based on receiving data including a status of an engine of the vehicle from the set of data sources, whether the engine is on or off,
wherein the data is received via the wireless network;
selectively communicating with, via the wireless network and based on determining whether the engine is on or off, the telematics device or the mobile device to obtain the input data;
processing, by the device, the input data to determine a state of a first job, of a plurality of jobs, based on a state of the vehicle and a state of an operator taken from the input data,
wherein processing the input data comprises:
determining a window of an expected arrival time associated with the first job; and
filtering a portion of the input data that is not within the window;
determining, by the device and based on the state of the first job, a plurality of estimated times of arrival of the vehicle at two or more downstream jobs, of the plurality of jobs, occurring after the first job,
wherein the plurality of estimated times of arrival are different from an initial plurality of estimated times of arrival, and
wherein at least one different estimated time of arrival, of the plurality of estimated times of arrival, is determined to be different using a heuristic relating to at least one of a driver break, a traffic condition, or an equipment availability identified based at least in part on the state of the vehicle or the state of the operator;
determining, by the device and based on the plurality of estimated times of arrival, a set of alerts or a set of response actions relating to the plurality of estimated times of arrival of the vehicle; and
communicating, by the device and via the wireless network, with at least one customer device associated with at least one of the two or more downstream jobs to provide an alert of the set of alerts or implement a response action of the set of response actions,
wherein the communicating with at least one customer device comprises transmitting information identifying an estimated time of arrival of the plurality of estimated times of arrival.

17. The method of claim 16 wherein at least one of the plurality of estimated times of arrival is determined based on an estimated weather condition concurrent with travel to a corresponding at least one of the two or more downstream jobs.

18. The method of claim 16, wherein at least one of the plurality of estimated times of arrival is determined based on an hours of service criterion determined based on the input data.

19. The method of claim 16, further comprising:
automatically updating, periodically, the state of the vehicle or the state of the operator; and
automatically recalculating the plurality of estimated times of arrival based on automatically updating the state of the vehicle or the state of the operator.

20. The method of claim 16, wherein the state of the vehicle is determined based on a heuristic relating to at least one of:
job departure,
job completion,
out of order arrival,
late arrival, or
off route travel.

* * * * *